May 27, 1969 HSUE C. TSIEN 3,445,887
SCREW FEED BIAXIAL STRETCHING MACHINE
Filed Nov. 17, 1966 Sheet 2 of 4

Inventor
HSUE C. TSIEN
By Donald F. Wohlers
Patent Attorney

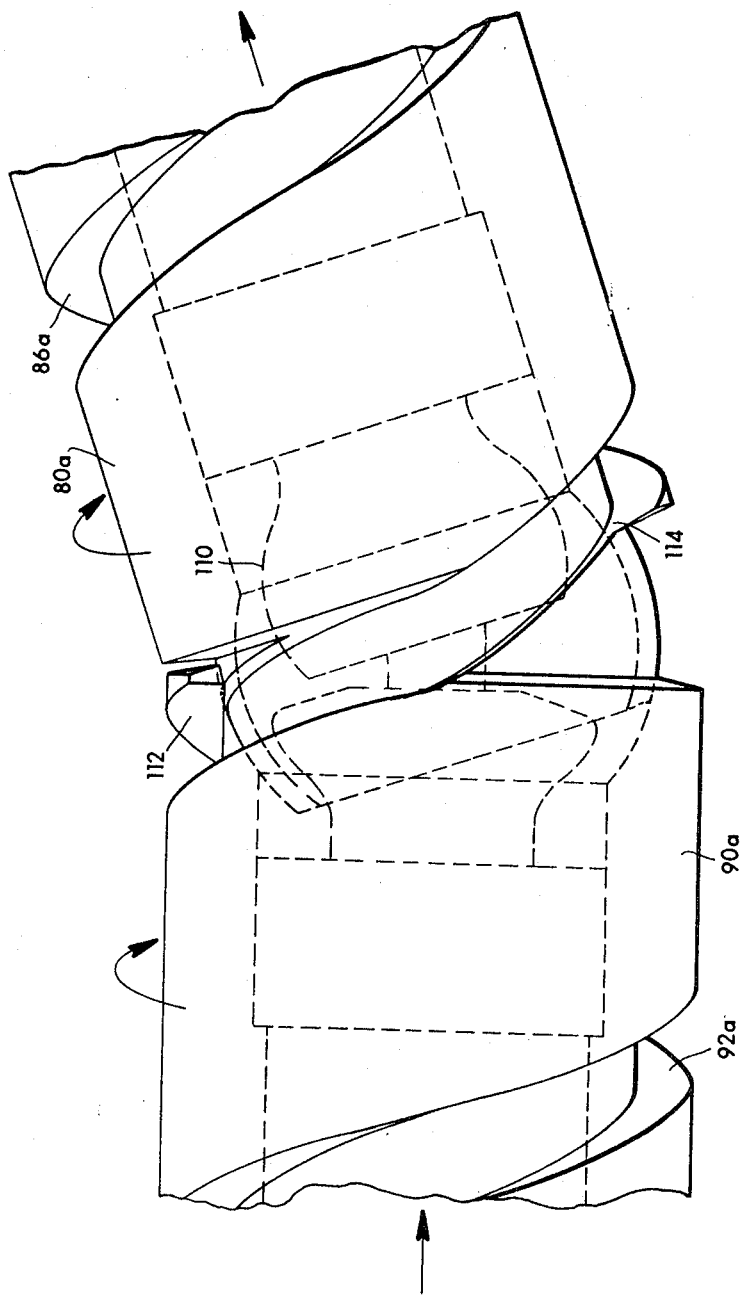

HSUE C. TSIEN  Inventor

By *Donald F. Wolders*
Patent Attorney

United States Patent Office 3,445,887
Patented May 27, 1969

3,445,887
SCREW FEED BIAXIAL STRETCHING MACHINE
Hsue C. Tsien, Livingston, N.J., assignor to Esso Research and Engineering Company, a corporation of Delaware
Filed Nov. 17, 1966, Ser. No. 595,113
Int. Cl. B29d 31/00
U.S. Cl. 18—1          2 Claims

ABSTRACT OF THE DISCLOSURE

A biaxial web stretching machine for sheet plastic and the like, having a plurality of individual and independently movable web gripping means which are conveyed about a pair of endless circulating pathways. The pathways include cooperative opposed parallel infeed portions, divergent stretch portions and parallel outfeed portions, all of which have associated with a plurality of underlying gripper advancing screw feed means. The screw feed means are interconnected with universal joints and include thread means overlying the universal joints to provide a smooth and positive transition of each of the individually movable gripper meanes between the interconnected screw feed means. Sprocket means are employed at either end of each of the feed pathways for transferring the gripper means to a return screw means and removing the gripper means from the return screw means to recycle the gripper means through the stretching zone. Each of the respective sprocket means is geared to drive its associated screw feed means on the outlet side thereof so that accurate timing between the sprocket means and the screw feed means to which each respective sprocket delivers its gripper means is assured.

---

The present invention relates to sheet stretchers.

More particularly, the present invention relates to stretchers especially suited for the biaxial stretching of thermoplastic sheets, although many of the features of the invention are equally applicable to machines for stretching sheets in only one direction.

Although several different types of machines are already known for the purpose of biaxial stretching of thermoplastic sheets, these known machines suffer from a variety of drawbacks. In certain types of machines, for example, the advance of the sheet through the stretching machine is derived solely by pulling on the sheet itself, so that a lack of uniforming in the stretching necessarily results. Also, with certain types of machines extreme difficulty is encountered in the synchronization of the various components, resulting in frequent jamming of the machine as well as in other types of faulty operation and frequent breakdowns requiring large maintenance costs. In addition, the known machines, because of the many complex components thereof, are extremely expensive to manufacture and install.

It is accordingly a primary object of the present invention to provide a stretching machine which is capable of operating very smoothly with a minimum amount of maintenance, providing jam-free operation and smooth uninterrupted movement of all of the components during continuous operation of the machine.

In addition, it is an object of the present invention to provide a machine of this type which is of relatively low cost, as compared to known machines which are used for similar purposes.

Another object of the present invention is to provide for a machine of this type transmissions between the various components which will guarantee synchronism in the progress of components of the machine from and to the structures which advance these components along the machine.

Another object of the invention is to provide novel intermediary groove means for accomplishing a smooth transition of clamps between non-aligned screw conveyors.

The machine of the invention includes a plurality of sheet-gripping means for initially gripping the sheet material which is to be stretched, prior to the actual stretching thereof, for holding onto the sheet material during the stretching thereof, and for releasing the sheet material subsequent to the stretching thereof. A stretching screw means coacts with the plurality of sheet-gripping means for advancing them along a predetermined path while increasing the distance between the plurality of sheet-gripping means from an initial distance where the sheet is still unstretched to a final distance where the plurality of gripping means are more distant from each other so that stretching of the sheet material takes place in at least one direction. An infeed screw means coacts with the plurality of gripping means to maintain them at the above initial distance from each other while advancing them to the stretching screw means, and this infeed screw means of the invention maintains the plurality of gripping means at the above initial distance, one with respect to the other at least from the moment when the plurality of gripping means initially grip the sheet material. An outfeed screw means coacts with the stretching screw means to receive the gripping means from the stretching screw means, and the outfeed screw means maintains the plurality of the gripping means at the above final distance from each other at least until the moment when the plurality of gripping means release the sheet material, so that the sheet material remains in its stretched condition while the outfeed screw means advances the plurality of gripping means away from the stretching screw means.

Therefore, with this construction the positive control of the distance between the plurality of sheet-gripping means determined by the feed screw means from the instant when they initially grip the sheet material until the instant when they finally release the sheet material provides an extremely precise regulation of the manner in which the sheet material is stretched. At no time are there any extraneous factors, such as pulling on the sheet material itself to advance it, or chain stretching, or friction in the resistance of movement of the plurality of gripping means, which produce uncontrollable variables in the manner which the sheet material is stretched. Because the plurality of sheet-gripping means are precisely controlled with respect to their distance from each other from the moment when they grip the sheet material until the moment when they release the sheet material, the quality of the stretching achieved with the structure of the present invention is extremely high.

The invention is illustrated by way of example in the accompanying drawings which form part of this application and in which:

FIG. 1 is a partly schematic top plan view of one possible embodiment of a sheet stretcher according to the present invention, part of the structure being eliminated from the right side of FIG. 1 so as to show the arrangement of screws and the transmission structure of the invention, while the left side of FIG. 1 illustrates the camming structure for the clamps of the gripping means which are only schematically indicated in part in FIG. 1;

FIG. 4 is a fragmentary top plan view showing the structure at the junction between a pair of screws;

Figure 1:
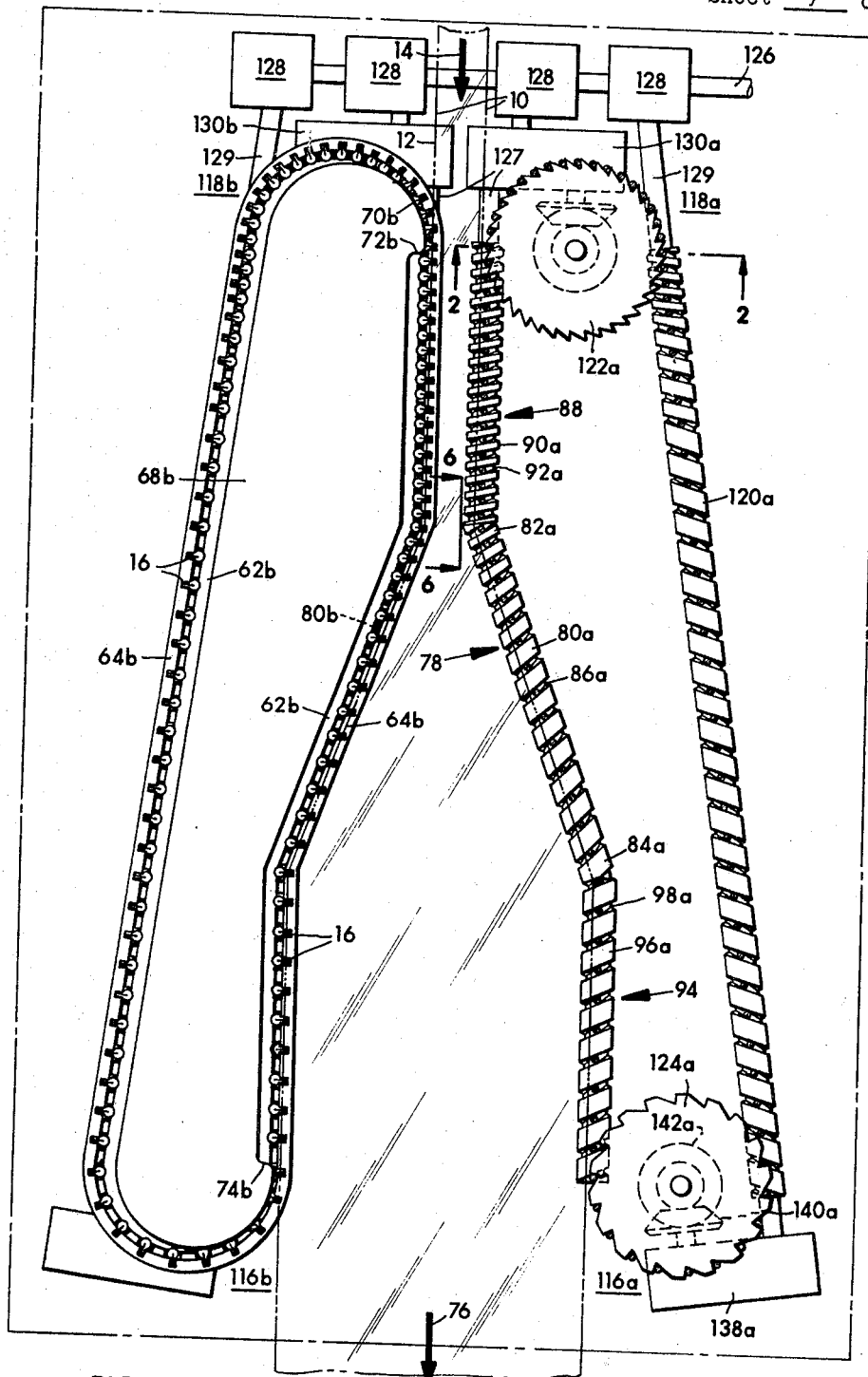
Figure 6:
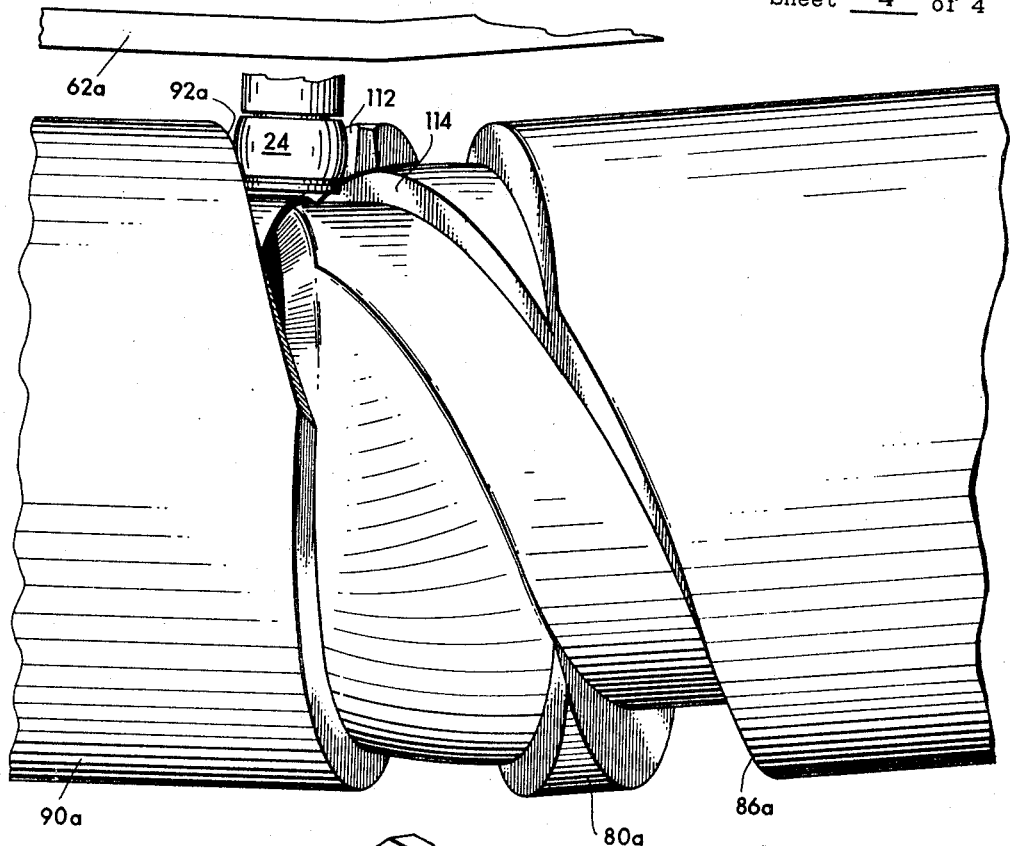
Figure 5:
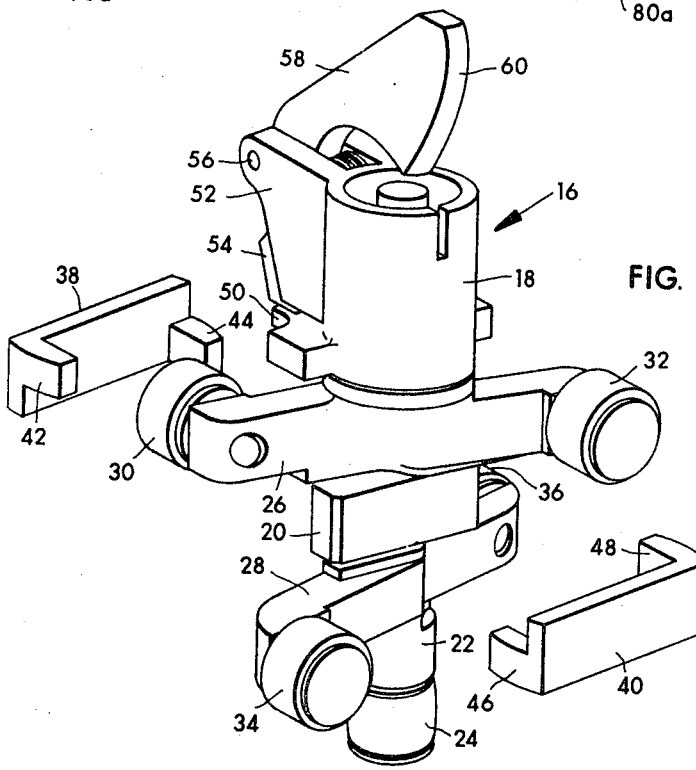

FIG. 5 is a perspective view of one of the sheet-gripping means of the invention, shown as it appears from the rear at its side directed away from the sheet which is to be gripped, FIG. 5 also showing separated from the sheet-gripping means slide bearing members which coact with the sheet gripping means to participate in the guiding thereof along guide rails of the machine; and FIG. 6 is a fragmentary side elevation taken along line 6—6 of FIG. 1 in the direction of the arrows and showing the sheet-gripping means as they appear during transition from an infeed screw to a stretching screw, the scale of FIG. 6 also being larger than that of FIG. 1.

Referring now to FIG. 1, the pair of dot-dash lines 10 schematically represent the opposed side edges of a web of thermoplastic sheet material 12 which is to be stretched with the machine of the invention. This sheet material 12 moves in the direction indicated by the arrow 14 from any suitable source. For example, the sheet material 12 may be taken from a supply roll, or it may be fed directly into the machine of the invention from an extruder in which the sheet material web 12 is initially extruded. It has been found that it is possible to improve the structure of the sheet material 12 considerably by subjecting it to stretching of the type provided by the machine of the invention, and during this stretching of the sheet material it may be maintained at an elevated temperature in any suitable way, such as by arranging suitable heaters (not shown) adjacent to the plane in which the sheet material advances during stretching thereof, or by arranging the entire apparatus of the invention in a suitable oven, for example.

Just beyond the location of the arrow 14 of FIG. 1, the sheet material 12 moves though an infeed region of the machine where the sheet material is initially gripped as its opposed edges 10 by a plurality of sheet-gripping means of the invention.

Figure 2:
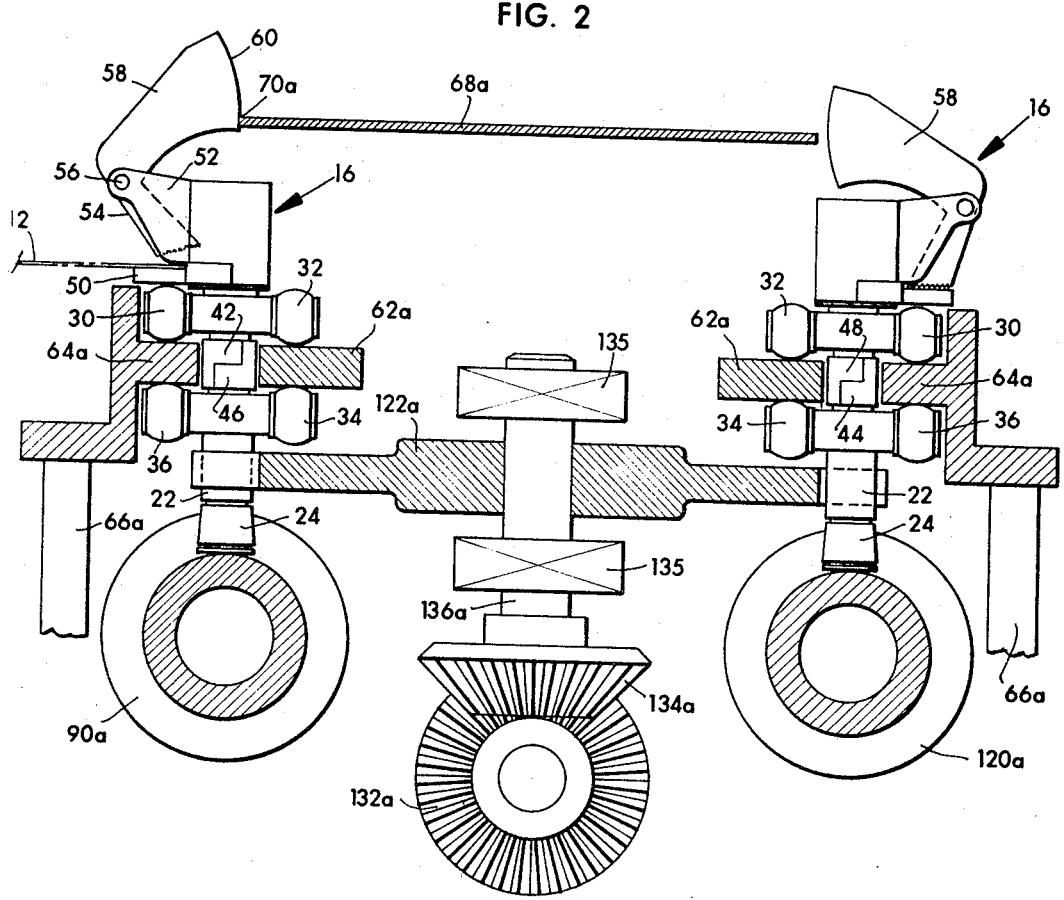
FIG. 2 is a fragmentary transverse sectional elevation taken along line 2—2 of FIG. 1 in the direction of the arrows, showing part of the structure of the invention at the infeed region thereof where the sheet material is initially gripped, the scale of FIG. 2 being substantially greater than that of FIG. 1.

The structure of the sheet-gripping means of the invention is apparent from FIGS. 2, 5, and 6. Referring to FIG. 5, each gripping means 16 includes an elongated body 18 which extends in a generally vertical direction in the machine, this elongated body 18 having an intermediate portion 20 which extends through a space defined between a pair of guide rails, as will be apparent from the description below. At its lower end, the body 18 has an elongated bar portion 22 which carries a roller 24 supported for rotary movement by any suitable bearings, and this roller 24 extends directly into the threads of the screws of the invention.

Just above its intermediate portion 20, the body 18 carries a horizontally extending arm 26, while just below the intermediate portion 20 the body 18 carries a lower horizontally extending arm 28. The arm 26 rotatably carries at its end a pair of oppositely directed rollers 30 and 32 which respectively ride on inner and outer guide rails such as 62a and 64a, later described. Below its intermediate portion 20, the body 18 carries an arm 28 which extends horizontally and which turnably carries at its ends a pair of oppositely directed rollers 34 and 36, the roller 34 engaging the underside of the outer rail while the roller 36 engages the underside of the inner rail, as will be apparent from the description below.

The intermediate portion 20 is surrounded by a pair of identical interlocking slide or bearing members 38 and 40, the slide member 38 terminating in a pair of transversely extending end fingers 42 and 44, while the slide member 40 terminates in a pair of end fingers 46 and 48. Thus, when the slide members 38 and 40 are situated between the arms 26 and 28 surrounding the intermediate portion 20, the finger 42 of the slide member 38 overlies the finger 46 at one end of the intermediate portion 20, while at the other end of portion 20 it is the finger 48 of the slide member 40 which overlies the finger 44 of the slide member 48.

Just above its horizontal arm 26, the body 18 carries an inwardly directed sheet-supporting finger 50 forming a stationary gripping element of the gripping means and having a flat top surface against which the underside of the sheet material is pressed during gripping thereof. Above the finger 50 the body 18 carries a pair of forwardly directed parallel plate portions 52 which are spaced from each other so as to accommodate between themselves a swingable gripping element 54 which coacts with the stationary gripping element 50 to grip the sheet material. A pivot pin 56 extends through an opening of the movable gripping element 54 and is carried by the plate portions 52 so as to support the movable gripping element 54 for swinging movement. At its upper end the element 54 carries a rearwardly directed ear 58 terminating in a curved arcuate edge 60 which is adapted to engage a cam which controls the gripping and release of the sheet material. An unillustrated spring acts on the swingable gripping element 54 to urge it to its gripping position.

Referring to FIG. 2, there are illustrated therein a pair of gripping means 16 at the infeed region where they are acted upon to grip the sheet material 12, and the pair of gripping means 16 of FIG. 2 are shown together with the inner guide rail 62a and the outer guide rail 64a which serve to guide these gripping means for movement along the right loop of FIG. 1. The inner guide rail 62a and the outer guide rail 64a define between themselves an elongated endless space through which the intermediate portion 20 of each gripping means extends. This elongated endless space forms a loop along which the plurality of gripping means are successively advanced, in a manner described below, at each side of the longitudinal center line of the sheet material 12. The manner in which the pair of slide members 38 and 40 coact with the inner side edges of the rails 62a and 64a is particularly apparent from FIG. 2, as well as the manner in which the rollers 30, 32, 34, and 36 of each gripping means 16 coact with the guide rails. The outer guide rail 64a is supported in any suitable way by a supporting structure 66a. FIG. 2 also illustrates how the rollers 24 at the lower ends of the bar portions 22 of the several gripping means 16 are received in the screw threads of the rotary screws which are described below.

FIG. 1 shows the endless inner guide rail 62b and outer guide rail 64b which define themselves the loop at the other side of the center line of the sheet material and along which successive sheet gripping means of the invention are advanced in precisely the same way as in the case of the loop at the right side of FIG. 1, the structure and operations taking place on the left side of FIG. 1 being a mirror image of the structure and operations taking place at the right side of FIG. 1.

Situated over the space surrounded by the closed loop at the left side of FIG. 1 is a horizontal cam plate 68b which has a camming edge which controls the movable gripping elements 54. The corresponding camming plate 68a is omitted from FIG. 1 but is situated in the same way over the space surrounded by the right loop along which the plurality of right gripping elements move. This comming plate 68a is shown in section in FIG. 2 coacting with the left gripping means 16 of FIG. 2 which is about to be acted upon so as to grip the sheet material 12 shown at the left portion of FIG. 2. This region is just beyond the arrow 14 at the infeed region, and at this region the camming edges 70a and 70b of the cam plates 68a and 68b engage te rear curved edges 60 of the rearwardly-directed ears 58 of the movable gripping element 54 so as to turn them in opposition to the springs which act thereon to the position indicated for the left gripping means 16 of FIG. 2, where the bottom toothed or knurled gripping end of each movable gripping element 54 is elevated away from the stationary gripping element 50. In this way a free space is formed between the gripping elements into which the sheet material 12 moves as it advances in the direction of the arrows 14 and 76 shown in FIG. 1, the arrow 76 indicating the movement of the stretched sheet material at an outfeed region of the machine where the successive gripping elements are received from screws referred to below and where the stretched sheet material is received on a take-up roller, for example, or advanced to any desired apparatus for further treating the stretched sheet material. The sheet material, as it moves in the directions of the arrows 14 and 76, remains in a plane which coincides with the upper surface of each stationary gripping element 50 so that in this way the sheet material will assume the position shown at the left side of FIG. 2 beneath each movable gripping element 54 which is raised by the cam 68a or 68b. It is to be understood that at the opposed side edges 10 of the sheet material there are pairs of gripping means 16 which are maintained in alignment with each other.

As the plurality of gripping means are successively advanced in the direction of the arrows 14 and 76, they reach the curved camming edges which recede away from the ears 58. Thus, the cam 68b is shown with a curved camming edge portion 72b which extends outwardly away from the center line of the sheet material so as to recede from the element 54 which is thus released to engage the sheet material, and in the same way the cam 68a has a receding camming portion which is not illustrated by which is situated directly opposite the receding portion 72b, so that at the right loop the gripping elements grip the sheet material simultaneously with the gripping thereof by the gripping elements at the left loop of FIG. 1. In this way the sheet material is initially gripping by the plurality of gripping means 16 at the infeed region of the machine of the invention, and the sheet material remains gripped by the plurality of gripping means until they reach the outfeed region shown at the location of the arrow 76 of FIG. 1. At this region the cams 68a and 68b have curved camming edge portions which extend inwardly to again engage the curved cam follower portions 60 of the ears 58 so as to place the plurality of gripping means in their non-gripping conditions, thus releasing the sheet material. FIG. 1 shows the camming edge portion 74b of the camming plate 68b, this camming edge portion 74b extending inwardly to engage the movable gripping elements and displace them from the stationary gripping elements so as to release the sheet material in response to the continuous movement of the plurality of gripping means. The camming structure of the right loop operates in precisely the same way and in synchronism with the camming structure at the left loop.

The structure of the invention includes a stretching screw means 78 which includes a pair of rotary screws 80a and 80b. A part of the screw 80a is visible in FIG. 6, FIG. 6 showing, in particular, how the threads of the screw 80a cooperate with the rollers 24 of the gripping means 16 and how each roler 24 smoothly and positively moves over the angular transition between the infeed screw 90a and the stretching screw 80a. FIG. 6 also shows the inner guide rails 62a.

The axes of the screws 80a and 80b are situated in a plane which is parallel to and beneah the plane in which the sheet material 12 is located. The pair of stretching screws 80a and 80b, which form the stretching screw means 78, have at a receiving end of the stretching screw means 78 a pair of ends 82a and 82b (FIG. 6) which are relatively close to each other, while at a discharge end of the stretching screw means 78, the pair of screws 80a and 80b thereof have a pair of ends which are spaced from each other by a distance considerably greater than the distance between ends 82a and 82b. Thus, the pair of stretching screws diverge from each other in the direction of advance of the sheet material through the stretching machine of the invention. FIG. 1 shows the end of 84a of the screw 80a at the discharge end of the stretching screw means 78, and it is to be understood that the unillustrated end of the other stretching screw 80b is directly opposite the end of 84a on the other side of the center line of the sheet material.

Each stretching screw is formed at its exterior surface with a thread such as the thread 86a shown for the stretching screw 80a in FIG. 1. It is these threads which receive the rollers 24 and which serve to advance the plurality of gripping means, during rotation of the screws.

It will be noted that in the particular example illustrated, not only do the pair of stretching screws diverge from each other but, in addition, the pitch of the threads changes along the length of each screw so that the convolutions of the thread at the discharge ends of the stretching screws are spaced from each other by a distance considerably greater than the distance between the thread convolutions at the receiving end of the stretching screws. Therefore, with the structure of the invention the plurality of gripping means, while being spread apart from each other by the diverging relationship of the stretching screws, are also displaced from each other along the axes of the screws, so that the pairs of successive gripping means 16 are displaced from an initial distance from each other to a final distance from each other considerably greater than this initial distance both longitudinally and laterally of the sheet material. In his way, a simultaneous bi-axial stretching of the sheet material is achieved. However, it is to be understood that, if desired, only lateral stretching of the sheet material could be produced simply by providing the stretching screws with a uniform thread pitch, or only longitudinal stretching could be produced by arranging the screws parallel to each other while maintaining a variable pitch of the type indicated in FIGS. 1 and 6.

The plurality of gripping means are successively delivered to the stretching screw means 78 by an infeed screw means 88 which includes a pair of parallel infeed screws of which only the infeed screw 90a is shown in FIG. 1. However, another infeed screw precisely the same as the infeed screw 90a is situated beneath the left loop of FIG. 1 and coacts with the screw 80b in precisely the same way as the feed screw 90a coacts with the screw 80a. The pair of infeed screws are parallel to each other and have their axes extending parallel to the longitudinal center line of the sheet material so that the pair of infeed screws respectively make equal angles with the pair of stretching screws. It is to be noted that the ends of the infeed screws which are adjacent the receiving ends of the stretching screws are located directly next to these receiving ends. The infeed screws which form the infeed screw means 88 have threads, such as the thread 92a shown for the infeed screw 90a in FIG. 1, and these threads are of a uniform pitch and serve to maintain the successive gripping means at a given initial distance from each other as they are delivered to the receiving ends of the stretching screw means 78. At this initial distance from each other the successive gripping means of each loop grip the sheet material without stretching the latter. It is to be noted particularly from FIG. 1 that the infeed screw means 88 coacts with the plurality of gripping means at the moment when the receding camming portions, such as the receding camming portions 72b, release the movable gripping elements to engage the sheet material, so that the distance between the successive gripping elements is controlled at least from the moment when the sheet material 12 is gripped by the plurality of gripping means after they have engaged the screw means. As the screws of the infeed screw means 88 turn, they advance the successive gripping means to the stretching screw means 78 while controlling the distance between the successive gripping means.

Situated at the discharge end of the stretching screw means 78 is an outfeed screw means 94 which also includes a pair of longitudinal screws whose axes are situated equidistantly from and on opposite sides of the longitudinal center line of the sheet material. Thus, FIG. 1 shows the right outfeed screw 96a which extends from the right stretching screw 80a at the discharge end 84a thereof, and precisely the same structure is located at the left loop of FIG. 1. The rotary screw 96a has a thread 98a of uniform pitch which is equal to the pitch of the thread at the discharge end 84a of the stretching screw 80a, so that when the plurality of successive gripping means are advanced by the pair of outfeed screws forming the outfeed screw means 94, the successive gripping means will be maintained from each other at the final distance to which they have been displaced both laterally and longitudinally of the sheet material. Thus, the sheet material remains stretched and held by the plurality of gripping means until the latter are acted upon by the cams 68a and 68b to release the sheet material. Thus, the camming portion 74b of the cam 68b will actuate the movable gripping elements to release the sheet material, and in the same way the gripping means 16 of the right loop are acted upon to simultaneously release the sheet material at the outfeed region of the machine.

Figure 3:
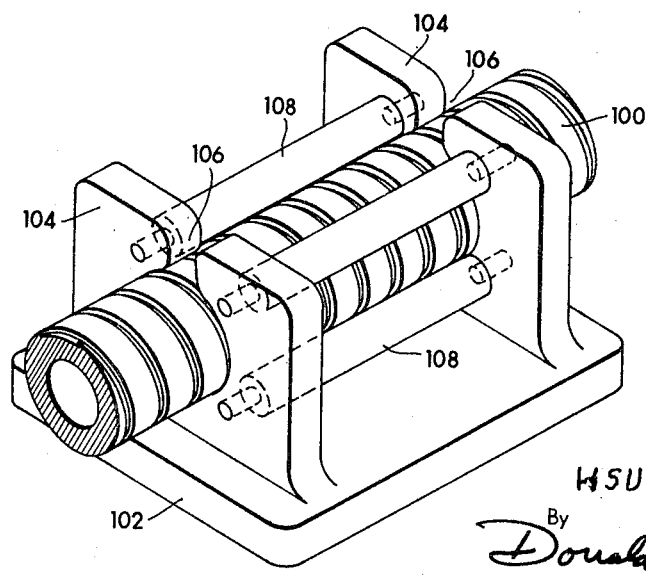
FIG. 3 is a perspective illustration showing one of a number of bearings suitable for supporting the screws of the invention for rotary movement.

The several rotary screws are supported for rotary movement by any suitable bearing structure, such as that shown in FIG. 3. Thus, FIG. 3 shows a portion of a typical screw 100 which may be any of the rotary screws of the machine of the invention. This screw 100 extends through a frame structure 102 which is supported on any suitable base plate so as to be held stationary and which has a pair of upwardly directed flanges 104 which extend only part of the way around the screw 100 so as to leave at the upper portion thereof the spaces 106 through which the bottom ends of the gripping means 16 can freely pass. The pair of flanges 104 support a plurality of rollers 108 which directly engage the rotary screws, so that by way of these freely turnable rollers 108 the several rotary screws are supported for rotation about their axes in a highly effective manner, while these axes are maintained at the desired locations without any possible shifting of these axes. The tubular structure of the screw 100 is apparent from FIG. 3, and it is also apparent from FIG. 3 that the several rollers 108 provide a highly effective support for the screws over a considerable length thereof. A plurality of the bearing structures shown at FIG. 3 are distributed along the screws of the invention to be situated at suitable locations to provide reliable support for the screws during rotation thereof. At the regions where ends of a pair of screws adjoin each other at an angle, the bearings as shown in FIG. 3 may have rollers 108 either of a tapered configuration or supported at suitable inclinations to take up thrust, if desired, so that in this way the bearings will serve both as thrust bearings and as bearings for simple rotary movement.

The pair of infeed screws which form the infeed screw means 80 are driven in a manner described below. These infeed screws transmit the drive to the stretching screw means 78 and the stretching screw means 78 in turn transmits the drive to the outfeed screw means 94. For this purpose, as shown in FIG. 4, the hollow tubular screws, such as the screws 90a and 80a shown in FIG. 4, are interconnected at their adjoining ends by a known constant-velocity universal joint structure, sometimes referred to as a Tracta constant-speed universal joint. These known universal joint structures are fixedly mounted in the interiors of the adjoining ends of the tubular screws and act to rotate the driven screw at the same rotary speed as the driving screw while at the same time maintaining the relative angular positions of the screws, as indicated in FIG. 4. These joint structures may have an angular velocity fluctuation of as little as 0.69% at an angle of 35°. At a smaller angle, the fluctuation of angular velocity is much less. The two ends of the intersecting shafts are joined together with male and female (ball and socket) spherical contours having the same center of sphere which is the joint of intersection between the two shaft center lines. The present invention is adaptable to the screw feeding of stretching clamps through any reasonable angle of intersection between shafts.

Thus, FIG. 4 shows schematically a universal joint structure 110 fixed at its ends to the pair of screws 90a and 80a in the interiors thereof and transmitting the drive from the screw 90a to the screw 80a in such a way that the latter is constrained to rotate at the same speed as the screw 90a, and of course the several screws have the same diameter so that with this arrangement the thread 86a of the driven screw 80a will form a substantially uninterrupted smooth continuation of the thread 92a of the screw 90a. Thus a very smooth transition of the gripping elements from the infeed screws to the stretching screws will be achieved. The screws illustrated are provided with single threads, and the synchronism in the transmission of rotary movement from one screw to the next will maintain the outlet end 112 of the thread 92a precisely in alignment with the inlet end 114 of the thread 86a so that when the roller 24 of a gripping means 16 reaches the end 112 it will move smoothly from the latter directly into the end 114 of the thread 86a (see FIGS. 4 and 6). Thus, a novel and smooth transition of the gripping elements from one screw to the next is achieved.

The outfeed screws coact in exactly the same way as indicated in FIGS. 4 and 6 with the pair of stretching screws, so that with this construction a smooth uninterrupted advancing of the several gripping elements along the machine is assured.

In accordance with a further feature of the invention the plurality of gripping means are returned from the outfeed regions 116a and 116b indicated in FIG. 1 to the feed regions 118a and 118b also indicated in FIG. 1 by a return screw means of which only a return screw 120a is indicated in FIG. 1. It is to be understood that an identical return screw is provided for the left loop of FIG. 1. This return screw 120a thus extends from the outfeed region 116a to the infeed region 118a and serves to convey the successive gripping means of the right loop all the way along the outer run of the right loop of FIG. 1. In the same way, the successive gripping elements of the left loop will be recirculated by the unillustrated return screw means from the outfeed region 116b to the infeed region 118b.

The pair of return screws, such as the return screw 120a, have a variable pitch only in the region of the infeed regions 118a and 118b, as indicated for the screw 120a in FIG. 1, so that in this way the successive gripping means will have with respect to each other their initial closer distance when they are at the infeed regions 118a and 118b.

A pair of infeed transfer sprockets are provided for transferring the successive gripping means along the curved portions of the loops at the infeed regions 118a and 118b, and FIG. 1 shows the infeed transfer sprocket 122a. It is to be understood that an identical sprocket is situated at the infeed region 118b to guide the successive gripping means along the curved end of the left loop. The infeed transfer sprocket 122a is driven in a counterclockwise direction, as viewed in FIG. 1, so that the teeth thereof will engage the successive gripping means at the end of the return screw 120a and advance the plurality of gripping means to the inlet ends of the infeed screw means 88, the distance between the successive sprocket teeth of the infeed transfer sprockets together with the speed of rotation thereof being such that the successive gripping means will be smoothly and positively fed to the inlet ends of the infeed screws.

In the same way a pair of outfeed transfer sprockets are provided at the outfeed regions 116a and 116b. FIG. 1 shows the transfer sprocket 124a at the outfeed region 116a. It is to be understood, of course, that an identical sprocket is situated at the left loop of FIG. 1 at the outfeed region 116b. The sprocket 124a also turns in a counter-clockwise direction and its teeth are spaced from each other by a distance greater than the teeth of the sprocket 122a because of the greater distance between the successive gripping means as they move from the outfeed screw means 94. The unillustrated outfeed transfer sprocket of the outfeed region 116b turns, of course, in a clockwise direction.

The driving transmissions of the invention are characterized by extreme simplicity in construction, as well as by the small number of parts and by the very high degree of synchronism which it is capable of maintaining between all of the moving parts. This transmission means 128 includes a single drive means which includes a rotary drive shaft 126, shown at the upper right portion of FIG. 1. This drive shaft 126 is driven from a single electric motor, for example (not shown). The drive is transmitted from the shaft 126 to the four screws which constitute the return screw means and the infeed screw means. Thus, the pair of infeed screws, such as the screw 90a, are driven through their respective transmissions 128 from the drive means 126 by shafts 127. The pair of return screws, such as the return screw 120a, are also directly driven from the drive means 126 via connection shafts 129 and their respective outboard transmissions 128. For this purpose, the rotary drive shaft 126 may fixedly carry, for example, four bevel gear sets, each set giving a 1:1 speed ratio taking into consideration the various angles of intersection between the driving shaft 126 and driven shafts 129 and 127, so that in this way preciscely the same rotative speed is provided for these four screws.

As a result of this driving of the pair of infeed screws, they will necessarily turn at precisely the same speeds. By reason of the universal joint structure described above in connection with FIG. 4, the pair of stretching screws of the stretching screw means 78 will respectively be driven from the pair of infeed screws at precisely the same and uniform angular velocity. In the same way, the pair of universal joints such as that described above in connection with FIG. 4, which interconnect the stretching screws with the outfeed screws will serve to rotate the outfeed screws at precisely the same angular speeds as the stretching screws and the infeed screws. No drive is transmitted beyond the outfeed screws, so that one branch of the drive from the single drive shaft 126 is directed from the latter to the infeed screw means 88, from the infeed screw means 88 to the stretching screw means 78, and from the stretching screw means 78 to the outfeed screw means 94.

As was indicated above, the four transmissions 128, schematically indicated in FIG. 1, each serve to transmit the drive from the single source of power not only to the pair of infeed screws but also to the pair of return screws, but in accordance with the present invention the infeed transfer sprockets, such as the transfer sprocket 122a situated at the infeed region 118a, are driven only from the infeed screws. Thus, the transmission of the invention has a pair of transmission portions 130a and 130b which serve to transmit the drive from the pair of infeed screws or their respective drive shafts 127 to the infeed transfer sprockets. For this purpose, the rotary screw 90a can drive, through any suitable gearing or worm drive, the bevel gear 132a which meshes with a bevel gear 134a (FIG. 2) so as to drive a shaft 136a which is fixed to the bevel gear 134a for rotation therewith and which is supported for rotary movement in any suitable bearings 135. This shaft fixedly carries the infeed transfer sprocket 122a. In the same way the other infeed transfer sprocket at the infeed region 118b is driven from the other infeed screw which is not visible in the drawings.

Thus, it will be seen that by reason of the transmissions 130a and 130b the infeed transfer sprockets are not at all driven from the return screws but are driven solely by the infeed screws, so that a perfect synchronization in the delivery of the individual gripping means to the receiving or inlet ends of the infeed screws of the infeed screw means 88 is assured.

The same principle is utilized at the outfeed regions 116a and 116b. Thus, there is shown at the outfeed region 116a a transmission 138a driven from the return screw 120a and made up of any suitable gears or worm-and-worm-wheel drives so as to drive from the return screw 120a a bevel gear 140a which in turn drives a bevel gear 142a, which meshes with the bevel gear 140a, and it is this bevel gear 142a which is directly connected with the outfeed transfer sprocket 124a so as to transfer the successive gripping means 16 at the outfeed regions 116a and 116b to the ends of the return screws which are at the outfeed regions. Because the pair of outfeed transfer sprockets are driven directly from the return screws, a perfect synchronism in the delivery of the several gripping means to the receiving ends of the return screws is also guaranteed with the structure of the invention.

It will be seen that the structure of the invention all of the parts move in perfect synchronism so that a very precise stretching can be achieved without any possible jamming of the components, and thus an extremely small amount of maintenance and a very high service factor can be achieved with the invention.

It is to be noted in particular that the structure of the invention does not include any endless chains, pulleys, pulley belts, or the like, all of which give rise to undesirable vibrations and stretching of components of the machine resulting in a very costly, constantly changing relationship between the components of the machine not only as a result of aging of the components with the concomitant wear and tear on them, but also as a result of the temperature variations to which the structure of the invention is subjected during stretching of the sheet material. With structures which include chains, belts, and the like, as well as those structures which rely on tension of the sheet material itself to advance it through the machine, uncontrollable variations in the action of the stretching on the sheet material are introduced, resulting in a highly unreliable product. In contrast, with the structure of the invention the successive gripping means, and in particular the distance therebetween during the entire stretching sequence, is very precisely regulated, and in addition a substantially continuous screw means provides for movement of all of the gripping means substantially throughout the entire loops along which they move. In this way an extremely precise control of all the gripping means is achieved with the relatively simple and inexpensive structure of the invention.

What is claimed is:

1. In a biaxial web stretching machine of the type having a plurality of individual and independently movable web gripping means, and a pair of endless circulating pathways for said gripping means, each of said pathways including coopeartive opposed parallel infeed portions, divergent stretch portions, and parallel outfeed portions; the improvement comprising conveyor means associated with each of said pathways for advancing said gripping means around their respective pathways, each said conveyor means including an infeed screw disposed below said infeed portion, a divergent screw disposed below said divergent portion, an outfeed screw disposed below said outfeed portion, universal joint means interconnecting said infeed screw and divergent screw, and said divergent screw and said outfeed screw, first sprocket means for engaging said gripping means and advancing them to said infeed scred, said infeed screw being mechanically interconnected to said first sprocket means to turn in synchronism therewith; return screw means and second sprocket means, said return screw means being mechanically interconnected to said second sprocket means to turn in synchronism therewith, and common drive means for turning said first and second sprocket means.

2. The combination of claim 1 wherein the respective threads of said infeed, divergent and outfeed screws extend and overlie the universal joint means so that a smooth and positively driven transition occurs of each gripping means when leaving the infeed screw to engage said divergent screw and when leaving said divergent screw to engage said outfeed screw.

References Cited

UNITED STATES PATENTS 3,150,433  9/1964  Kampf.
3,305,889  2/1967  Lewis et al.

FOREIGN PATENTS 1,088,703  7/1960  Germany.
23,367  1/1959  East Germany.

WILLIAM J. STEPHENSON, *Primary Examiner.*

U.S. Cl. X.R.

62—255, 302